United States Patent [19]

Petersen et al.

[11] Patent Number: 4,759,168
[45] Date of Patent: Jul. 26, 1988

[54] MEDIUM-SPEED POWER-FEED BREAD SLICER

[75] Inventors: Bernard L. Petersen, Grand Rapids; Gary L. Kruse, Spring Lake, both of Mich.

[73] Assignee: Oliver Products Company, Grand Rapids, Mich.

[21] Appl. No.: 27,556

[22] Filed: Mar. 18, 1987

[51] Int. Cl.$^4$ .......................... B26D 7/06; B65B 5/06; B65B 25/18

[52] U.S. Cl. ...................... 53/516; 53/572; 83/155.1; 83/157; 83/431; 83/751

[58] Field of Search .................. 83/155, 155.1, 157, 83/427, 431, 437, 438, 444, 751, 808; 53/516, 571, 572, 573

[56] References Cited

U.S. PATENT DOCUMENTS

| | | | |
|---|---|---|---|
| 1,850,604 | 3/1932 | Rohwedder . | |
| 1,867,378 | 7/1932 | Rohwedder . | |
| 1,888,797 | 11/1932 | Gladeck et al. . | |
| 2,000,816 | 5/1935 | Bettendorf . | |
| 2,022,877 | 12/1935 | Bettendorf . | |
| 2,052,717 | 9/1936 | Littlefield . | |
| 2,082,945 | 6/1937 | Ferenci . | |
| 2,162,138 | 6/1939 | Tuthill et al. | 83/751 X |
| 2,170,312 | 8/1939 | Tuthill et al. . | |
| 2,215,036 | 9/1940 | Hartman . | |
| 2,247,401 | 7/1941 | Papendick | 53/516 X |
| 2,292,800 | 8/1942 | Rose . | |
| 2,332,084 | 10/1943 | Jensen . | |
| 2,332,316 | 10/1943 | Hexter et al. | 53/516 |
| 3,077,910 | 2/1963 | Hartman | 83/808 X |
| 3,538,671 | 11/1970 | Wallace | 53/572 X |
| 3,589,225 | 6/1971 | Wiatt | 83/427 X |
| 3,875,840 | 4/1975 | Moorman | 83/431 |
| 3,886,827 | 6/1975 | McCarthy . | |
| 4,099,434 | 7/1978 | Hardouin | 83/157 |
| 4,147,011 | 4/1979 | Kronseder et al. | 53/137 |
| 4,512,137 | 4/1985 | Koberlein . | |
| 4,576,074 | 3/1986 | Van der Togt . | |

FOREIGN PATENT DOCUMENTS

2462976 3/1981 France ................................ 83/751

*Primary Examiner*—James F. Coan
*Attorney, Agent, or Firm*—Price, Heneveld, Cooper, DeWitt & Litton

[57] ABSTRACT

The specification discloses a relatively high volume, economical bread slicer/bagger capable of operation by a single worker. The unit includes an accumulating infeed conveyor, a slicer, a bagger, a first diverter for shifting unsliced loaves individually from the conveyor to the slicer, and a second diverter for shifting sliced loaves individually from the slicer through the bagger. The slicing table is inclined from the horizontal and a trap door is provided in a lower portion of the table to periodically discharge accumulated crumbs. The slicing table includes a ridge just ahead of the knife assembly to orient loaves for proper perpendicular presentation to the knife assembly. A vertically reciprocable hold-down is provided to individually adjust to the height of each loaf moving across the slicing table.

46 Claims, 5 Drawing Sheets

MEDIUM-SPEED POWER-FEED BREAD SLICER

BACKGROUND OF THE INVENTION

The present invention relates to bread slicers, and more particularly to bread slicers capable of slicing and bagging a continuous stream of loaves.

As recognized by the old adage "The greatest thing since sliced bread", bread slicers have revolutionized the production, marketing, and consumption of bread products. Typically, slicers fall into one of three groups. The first group is for high-volume users and includes assembly-line type slicers wherein the unsliced loaves enter at one end of the machine and pass through slicing and bagging operations before exiting at an opposite end. These large machines include expensive band-type blades for rapidly slicing the loaves to deliver a production rate of about 60 loaves per minute. The second group is for low-volume users and provides only slicing. A power-belt or gravity delivery mechanism presents the loaves to an economical oscillating blade slicer. The sliced loaves must be bagged by hand—perhaps with the assistance of a hand-operated bagger. Production rates of machines in this second group are about 6 loaves per minute. The third group is for small-volume (on demand) users and includes machines typically referred to as countertop slicers capable of slicing a single loaf at a time. These smaller machines also include oscillating blade slicers adequate to slice single loaves at relatively low speeds.

Known machines do not meet the needs of many medium-volume users such as small wholesale operations and large retail operations requiring production rates between 6 and 60 loaves per minute. The high-volume slicers are too expensive and complicated for such operations, while the lower volume slicers are too slow and labor intensive. Consequently, this middle-market segment must make an undesirable choice between machines which are relatively expensive and more sophisticated than their needs dictate and machines which are too slow and labor intensive to meet their manufacturing requirements.

SUMMARY OF THE INVENTION

The aforementioned problems are overcome in the present invention which combines certain features from both prior groups of slicers into a unique configuration resulting in a medium-speed power-feed bread slicer.

In a first aspect of the invention, a relatively inexpensive and high volume bread slicer is provided by combining an oscillating blade slicer, a power-feed mechanism, and a bagger. More specifically, the slicer includes an accumulating conveyor for delivering loaves to the slicer mechanism, a diverter for sequentially diverting individual loaves from the conveyor to a pusher, a pusher for propelling the loaves through the oscillating blade slicer, and a second diverter for diverting the sliced loaves through the bagger and onto a catch tray or other device such as an automatic bag closer. The infeed conveyor and the catch tray are accessible by a single operator to reduce labor requirements. The operator places unsliced loaves on the infeed conveyor and removes bagged sliced loaves from the catch tray enabling a continuous stream of loaves to be processed through the machine by the operator at a rate of about 15 to 20 loaves per minute.

In a second aspect of the invention, the infeed table leading to the blade assembly has an elongated ridge oriented perpendicularly to the direction of travel of a loaf. Consequently, elongated loaves engage and catch on the ridge when propelled across the infeed table to become properly oriented with respect to the blade assembly prior to slicing. This action insures that the loaves are all sliced perpendicularly as required.

In a third aspect of the invention, the slicing table is tilted from the horizontal to improve gravity feeding of the loaves from the infeed conveyor to the pusher mechanism. However, this arrangement accumulates crumbs on the lower portion of the table. The third embodiment of the invention therefore includes a trap door in the lower portion of the table and an actuator for opening the door to release crumbs from the table surface. Preferably, the door is cycled after each cutting operation so that an absolute minimum of crumbs remains on the table.

In a fourth aspect of the invention, the slicer includes a vertically reciprocable hold-down mechanism which readily accommodates loaves of varying heights for proper support during slicing. More specifically the hold-down includes a plate generally parallel to the slicing table and an actuator for raising and lowering the plate. The plate is raised each time that a new loaf is brought into position for slicing and then lowered to rest on the loaf and hold the loaf against the table during slicing.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
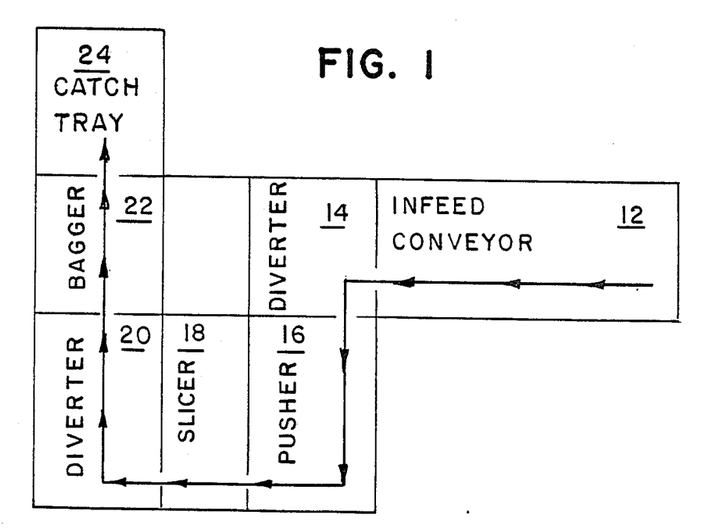
FIG. 1 is a top plan block diagram of the present bread slicer.
Figure 2:
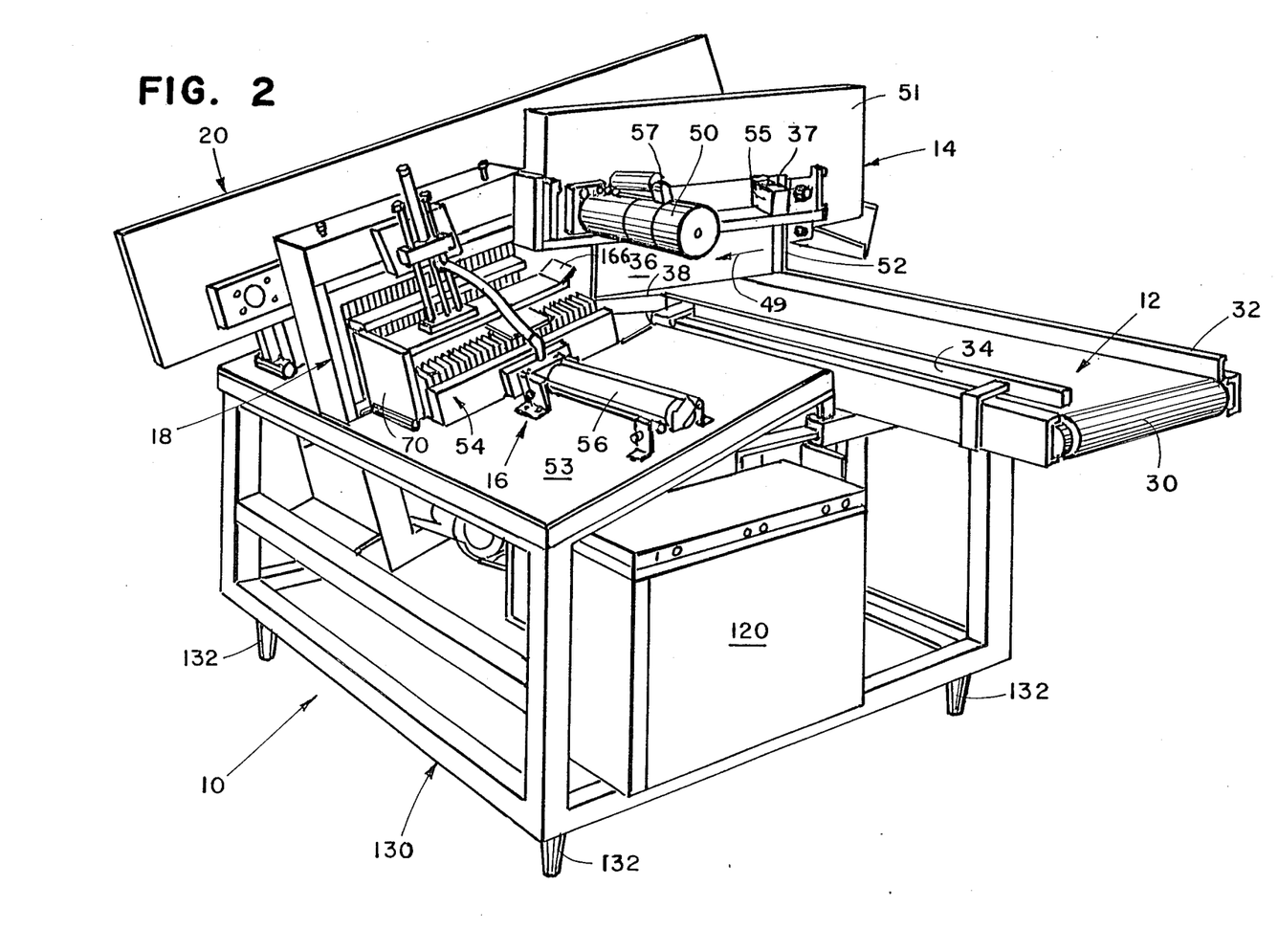
FIG. 2 is a perspective view of the slicer showing the infeed conveyor, the first diverter, the pusher mechanism, and the slicing mechanism.
Figure 3:
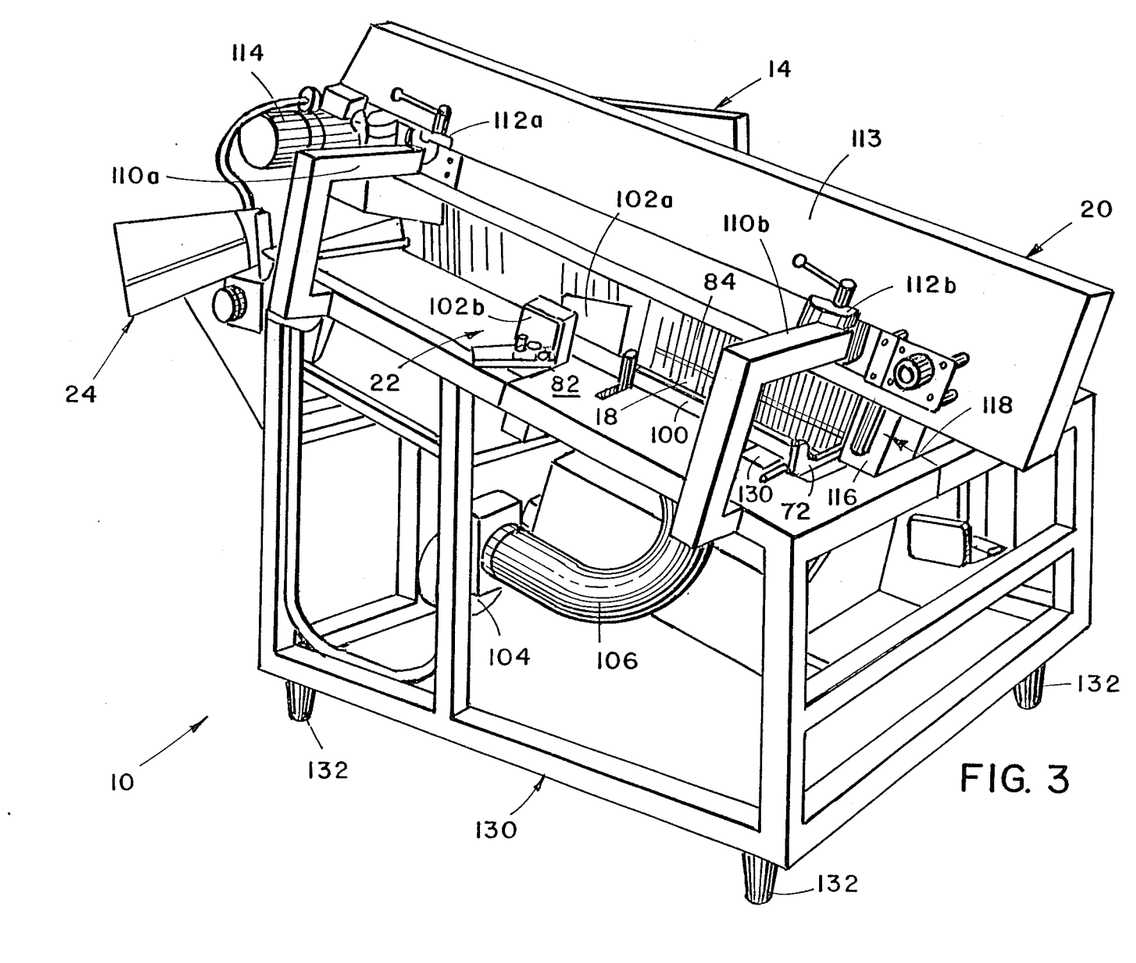
FIG. 3 is a perspective view of the slicer showing the slicing mechanism, the second diverter, the bagger, and the catch tray.

A medium-speed power-feed bread slicer constructed in accordance with a preferred embodiment of the invention is illustrated in FIGS. 1–3 and generally designated 10. Basically, the slicer includes an infeed conveyor 12, a first diverter 14, a pusher 16, a slicer 18, a second diverter 20, a bagger 22, and a catch tray 24. Each loaf sliced within the slicer 10 passes sequentially through these elements (see FIG. 1). The angular orientation of the loaf remains the same at all times as it passes through the slicer. The unique layout of the components and inclusion of the diverters 14 and 20 provides a compact relatively high-volume slicer operable by a single worker.

The infeed conveyor 12 (FIG. 2) is a conventional belt conveyor including a moving belt 30 and a pair of opposite guide rails 32 and 34. When the slicer is in operation, the belt 30 is driven by a motor (not shown) from right to left as viewed in FIG. 2 to deliver the loaves to the stop wall 36. A proximity switch (not shown) is provided in the stop wall 36 to detect the presence of a loaf thereagainst. The belt drive motor is stopped whenever a loaf is detected against the stop wall 36 and remains stopped until that loaf has been diverted as will be described. This periodic stopping improves diversion and reduces damage to the loaves. The left guide rail 34 (see also FIG. 4) stops short of the stop wall 36 to define an opening 38 through which a single loaf of bread can pass. Preferably, the guide rail 34 is slidably mounted in its longitudinal direction enabling the width of the opening 38 to be varied to accommodate different size loaves. Preferably, the width of the opening is selected to be slightly larger than the loaves being processed so that only one loaf at a time can pass therethrough.

The diverter 14 (FIG. 2) is of the type generally well known to those having ordinary skill in the art and is used to transversely shift loaves from the belt conveyor 12 to the pusher assembly 16. This diverter is powered by an electric motor 50 under microprocessor control. The diverter includes an endless loop chain (not visible within the housing 51) carrying a plurality of lugs or fingers 52 which engage the loaves to divert same. The lugs 52 move in the direction of arrow 49 to divert loaves from the conveyor through the opening 38. The diverter 14 is slidably carried on a pair of parallel rails 55 and can be locked at any position therealong using blocks 57. This permits positioning of the diverter 14 to engage the center of the heel of each loaf to improve diverting as will be described.

The pusher assembly 16 (FIGS. 2 and 4) is mounted on the infeed table 53. As perhaps best illustrated in FIG. 4, the pusher assembly includes a pusher 54 and a double action pneumatic cylinder 56. The pusher 54 is generally well known to those having ordinary skill in the art and includes a plurality of fingers 58 mounted in the block 59 and interfitting with the slicing knives (described below) to move or propel the loaf through the knife assembly. The pusher 54 is actuated by a linear thruster 56 which in the preferred embodiment is the linear thruster sold by Ultramation Inc. of Waco, Tex., as Model 2B-13L. The thruster 56 includes a pair of guide bars 62a and 62b which interfit with the slide block 64 to insure linearity of movement. The slide block 64 is fixedly secured to the bracket 60 mounted on the infeed table 53. The pusher block 59 rests directly on the infeed table 53 and rides therealong to support the fingers 58 above the infeed table. Preferably, the pusher block 59 includes integral feet (not shown) and is fabricated of a low friction material such as UHMW to facilitate movement of the pusher block 59 on the table 53.

A stop plate 70 (FIGS. 2 and 4) is also mounted on the infeed table 53 and extends generally perpendicularly upwardly therefrom. A proximity switch (not shown) is mounted in the stop plate 70 to detect the presence of a loaf thereagainst. The stop plate 70 is linearly aligned with the side guide 72 (see FIG. 3) to provide a continuous surface against which the loaf can ride as it is propelled through the knife assembly 18.

As illustrated in FIGS. 2 and 3, the planar infeed table 53 is inclined or tilted from the horizontal in a direction leading downwardly from the infeed conveyor 12. Consequently, a loaf of bread diverted by the mechanism 14 will slide down the infeed table 53 until the loaf abuts the stop plate 70. The tilt on the infeed table also holds the loaf in registration against the stop plate 70 and guide rail 72 during slicing to insure uniform cutting.

Figure 6:
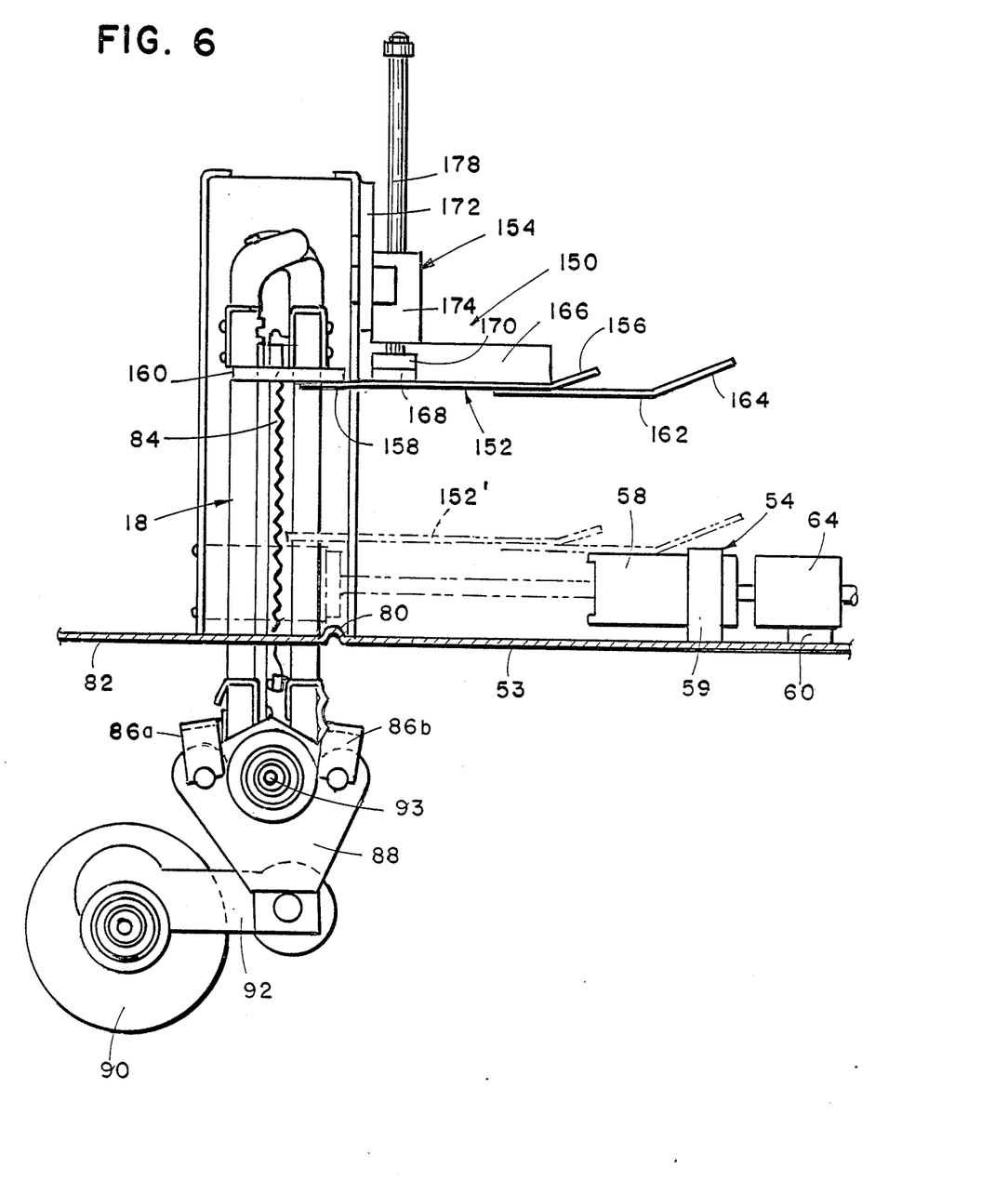
FIG. 6 is a sectional view taken along line VI—VI in FIG. 4.
Figure 7:
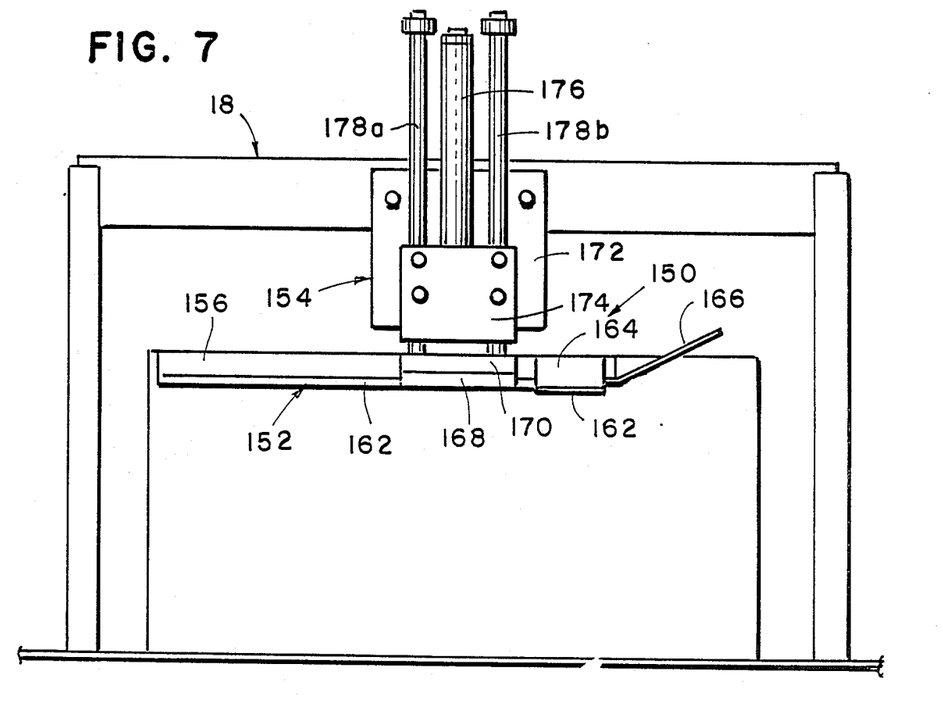
FIG. 7 is an elevational view of the hold-down mechanism.

The hold-down mechanism 150 is perhaps best illustrated in FIGS. 6 and 7, and includes a pressure plate 152 and an actuating or reciprocating mechanism 154. The pressure plate 152 is a generally planar element having an upwardly bent leading portion 156 and an opposite trailing portion 158. A plurality of plastic fingers 160 are mounted on the upper surface of the trailing portion 158 and extend between the individual blades 84 to space the blades one from another and to continue the hold-down function through the slicing assembly 18. A stop plate 162 is welded to the underside of the pressure plate 152 and extends forwardly therefrom to prevent the pressure plate from falling below the travel path of the pusher 54. The forward edge 164 of the stop plate 162 is also bent upwardly from the remainder of the plate to facilitate movement of the pusher 154 thereunder. The end 166 of the pressure plate facing the diverter 14 is also bent upwardly from the remainder of the plate 152. The end 166 thereby facilitates movement of the loaves to a position under the pressure plate 152 as will be described.

Preferably, the pressure plate 152 is substantially parallel, but at a slight angle, to the infeed table 53. Specifically, the pressure plate 152 is slightly inclined from parallel so that the trailing portion 158 of the pressure plate 152 is slightly closer to the infeed table 53 than is the opposite edge 156 of the pressure plate to form a tapered passage through which a loaf must pass.

The pressure plate 152 is welded to a mounting block 168 which in turn is secured to the connector block 170 of the actuating mechanism 154. Preferably, the actuating mechanism 154 is the linear thruster sold by Ultramation Inc. of Waco, Tex. as Model 1B-5. This linear thruster 154 includes a single-action pneumatic cylinder 176 to selectively raise the pressure plate. The actuating mechanism 154 includes a mounting block 172 secured to the knife assembly 18, a guide block 174 fixedly secured to the mounting block, and the cylinder 176. Guide bars 178a and 178b are slidably carried within the guide block 174 to insure linear motion. The plate 152 is lifted to the position illustrated in FIGS. 6 and 7 when the cylinder is pressurized and is free to fall to the position 152' illustrated in FIG. 6 when the pressure in the cylinder is released.

As illustrated in FIG. 6, an integral ridge 80 is formed in the infeed table 53 adjacent the slicing assembly 18. The ridge 80 (see also FIG. 4) extends the full length of the slicer assembly and extends approximately ¼ inch above the surface of the table 53. The purpose of the ridge 80 is to orient the loaf for proper presentation to the slicing assembly 18. As the loaves slide onto the infeed table 53 from the infeed conveyor 12, the loaves may become cocked from a position parallel to the pusher 54 and the blade assembly 18. However, as the pusher 54 moves the bread toward the blade assembly 18, the loaf catches on or engages the ridge 80 and rotates or shifts as necessary to become parallel to the pusher 58 and the knife assembly 18. This feature assures that all loaves are cut perpendicularly to the longitudinal direction of the loaf.

The outfeed table 82 (FIGS. 3 and 6) is generally parallel to and coplanar with the infeed table 53. The guide rail 72 (FIG. 3) extends across both the infeed table and the outfeed table from the stop plate 70 to provide a reference surface against which the lower heel of the loaf rides during movement through the slicing assembly 18.

Blade assembly 18 and the associated drive mechanism (FIG. 6) are generally well-known to those having ordinary skill in the art and have long been sold by Oliver Products Company, the assignee of the present invention, for example in its Model No. 777 bread slicer. Generally speaking, the drive mechansim includes a motor (not shown), a pulley 90, rod 92, and rocker 88. Rod 92 is eccentrically mounted at one end to pulley 90 and is pivotally mounted at its opposite end to rocker 88. Rocker 88 is pivotally supported on shaft 93 and oscillates thereabout when driven by rod 92 rotating eccentrically about pulley 90.

Blade assembly 18 (FIG. 6) includes first and second blade frames 86a and 86b each supporting a plurality of knives or blades 84, respectively. Frames 86 are each pivotally secured at one end to rocker 88 to oscillate with oscillation of the rocker. Frames 86 are each supported at their upper ends on frame links (not shown) in conventional fashion. The frames 86 oscillate in opposite directions.

Figure 4:
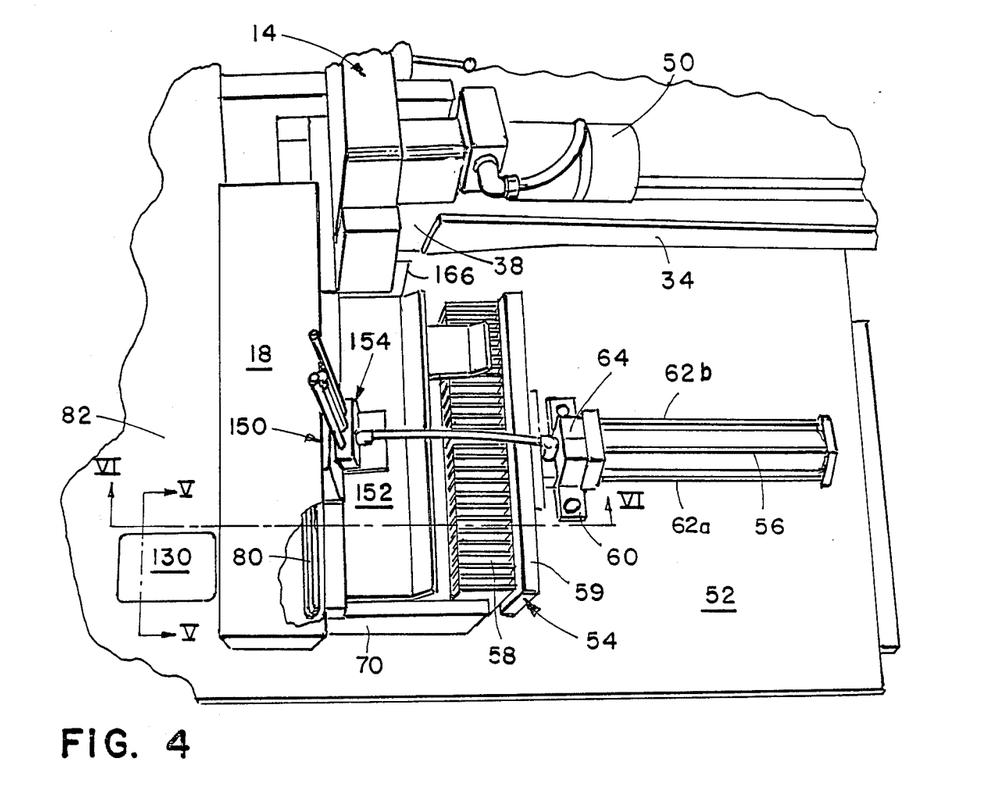
FIG. 4 is an enlarged top plan view primarily of the slicing table with the second diverter removed to show the trap door.
Figure 5:
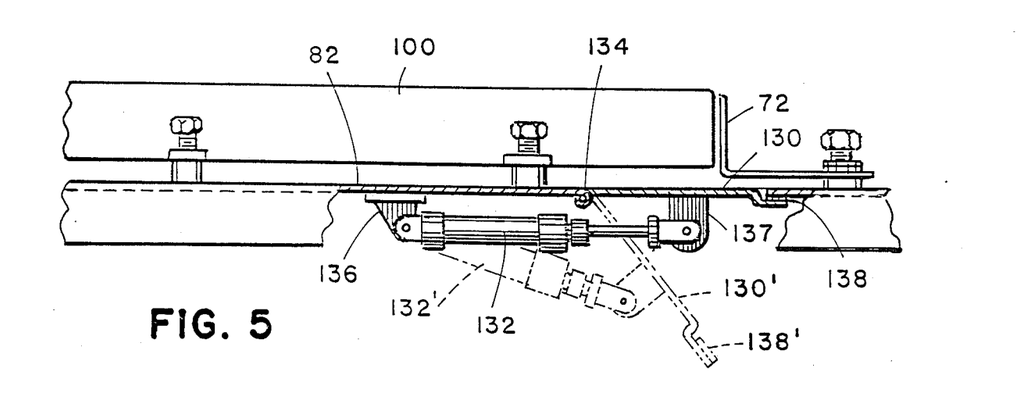
FIG. 5 is a sectional view taken along plane V—V in FIG. 4.

Crumbs produced by the movement and slicing of loaves within the device are dispensed through a novel trap door mechanism (FIGS. 4 and 5). Through gravity and vibratory action, the crumbs tend to accumulate against the stop plate 70 and the lower guide 72. Further, the continual movement of loaves from right to left as viewed in FIG. 4, tends to push the crumbs onto the outfeed table. A trap door 130 (FIGS. 4 and 5) is located at the lower end of the outfeed table 82. At least the lower portion of the trap door 130 extends downwardly beyond the guide 72 so that, when the door is opened, all crumbs resting against the guide and on the door will drop through the outfeed table. As seen in FIG. 5, the trap door 130 is hingedly mounted at its upper edge to the infeed table 82 by a hinge 134. A pneumatic cylinder 132 is pivotally connected between brackets 136 and 137 fixedly mounted on the undersides of the outfeed table 82 and the trap door 130, respectively. The lower edge of the trap door 130 is offset from the remainder of the door and supports a rubber bumper 138 to reduce noise during closing of the door. The cylinder 132 is actuated periodically as will be described to lower the trap door 130 to the position 130' illustrated in FIG. 5 permitting crumbs to drop through the outfeed table.

An outfeed guide rail 100 is slidably mounted on the upper surface of outfeed table 82 and fixed in position for a particular size of loaf being cut. Preferably, the guide rail 100 is positioned to closely receive a loaf between the guide rail and the fully extended position of the pusher 54 extending through the slicing assembly 18. The guide rail 100 is oriented so as to be generally perpendicular to the path of the bread moving through the knives 84 and provides a reference surface against which the bread can slide when diverted by the diverter 20.

A bagger assembly 22 is mounted in planar alignment with the outfeed table 82 and is generally well known to those having ordinary skill in the art. For example, such baggers have long been sold by Oliver Products Company as Models 1179 and 1279. Briefly summarizing, the bagger 22 automatically dispenses individual plastic bag wrappers retained on a wicket (not visible) downstream of the funnels 102a and 102b to receive individual loaves of bread. A blower 104 is mounted on the slicer frame and blows air through duct 106 into the individually dispensed bag (not shown) to open the bag and permit it to receive a loaf. At least the funnel 102b is slidably supported on the frame 130 enabling the user to select the width between the funnels 102 to properly accommodate the loaves being sliced. Preferably, the funnel 102b is generally aligned with the outfeed guide 100.

The bagging diverter 20 is also of the type generally well known to those having ordinary skill in the art and is generally similar, although longer, than the infeed diverter 14. The diverter 20 is slidably mounted on a pair of rails 110a and 110b and can be positioned at any location therealong. Locking blocks 112a and 112b are provided to secure the diverter in the selected position. Preferably, the diverter 20 is centered over the funnels 102 and the opening between the guide 100 and the slicer assembly 18 so that loaves are not cocked or twisted when diverted. As with the previously described diverter, the unit 20 includes an endless loop chain (not visible within the housing 113) driven by a motor 114. The chain carries a plurality of lugs 116 only one of which is visible in FIG. 3. The lugs travel in the direction of arrow 118 to carry, push, or propel individual loaves upwardly along the outfeed table 82 through the bagger assembly 22 and onto the catch tray 24. The bagger assembly 22 automatically dispenses and blows up or expands a new bag when the old bag is carried away with the diverted loaf.

The catch tray 24 is simply a means for receiving and accumulating sliced bagged loaves. Preferably, the size of the catch tray 24 is adequate to accumulate one or more loaves thereon enabling a small quantity of product to accumulate for subsequent handling by the single worker. Preferably, the catch tray 24 is angled downwardly in a direction opposite from that of the outfeed table 82 so that loaves pushed thereonto by the diverter 20 will gravity slide down to the bottom of the tray. It is envisioned that the catch tray 24 can be omitted so that the machine 10 can deliver sliced, bagged loaves to a downstream conveyor or automatic bag closer and/or tier.

All control for the slicer 10 is housed within the control box 120 (FIG. 2). The entire slicer is controlled by a microprocessor within the control box 120 and connected to all described proximity switches and to all mechanisms to be actuated. The implementation of the control for the slicer 10 would be routine to one having ordinary skill in the control art based on the present disclosure.

All components of the slicer/bagger are mounted on a frame 130 which includes feet 132 supporting the unit on the floor.

Operation

The present slicer/bagger permits a single worker to operate the machine at a relatively high-volume rate. This is partially facilitated by the proximity of the infeed conveyor 12 and the catch tray 24. When the machine 10 is turned on, the slicer mechanism 18 runs continuously.

Unsliced loaves are brought in a bakery rack to a position proximate the infeed conveyor 12; and an empty bakery rack is rolled to a position closely proximate the catch tray 24. The worker's function is to place unsliced loaves from the supply rack onto the infeed conveyor 12; and to remove bagged loaves from the catch tray 24, add bag ties or other closure mechanisms, and place the bagged loaves on the rack adjacent the catch tray. Of course, if the catch tray 24 is replaced by a conveyer or automatic bag-closing device, the operator's function may change somewhat.

The loaves are placed on the infeed conveyor 12 at any spacing from one another. The loaves are oriented with their longitudinal axis being in the direction of the width of the conveyor 12. Consequently, the side of each loaf will abut the stop wall 36 at the end of the conveyor. When the proximity switch in the stop wall 36 detects a loaf thereagainst, the conveyor 12 is stopped until that loaf is diverted onto the infeed table 53. The ability to place multiple loaves on the infeed conveyor 12 provides the operator with time to alternately remove bagged loaves from the catch tray 24.

The loaves on the infeed conveyor 12 are sequentially and individually diverted onto the infeed table 53. When a loaf is against the stop wall 36 as detected by the proximity switch therein, and when the pusher 54 is in the retracted position illustrated in FIGS. 2 and 4 as detected by another proximity switch on the thruster 56, the control 120 actuates the diverter 14 to divert the loaf adjacent the stop wall 36 onto the infeed table 53. The width of the opening 38 is adjusted as necessary to insure that only one loaf is diverted at a time. The diverter finger or lug 52 engages the end or heel of the loaf to push the loaf onto the infeed table 53; and the loaf slides downwardly into position with its opposite heel engaging the stop plate 70. The upwardly inclined end 166 of the pressure plate 152 facilitates guiding of the loaf under the plate.

When the loaf has been received against the stop plate 70 as detected by the proximity switch therein, the control 120 actuates the cylinder 56 to cause the pusher 54 to push or propel the loaf through the slicer assembly 18. At this time, the conveyor 12 is also restarted. As the loaf slides across the infeed table 53 toward the slicing mechanism 18, the underside of the loaf will engage or drag on the ridge 80 (FIGS. 4 and 6). If the loaf is cocked or slightly angled from being parallel to the pusher 54, the loaf will drag against the ridge 80 to become parallel to the pusher 54 and more importantly parallel to the knife arrangement of the slicing assembly 18. This insures that all slicing is perpendicular to the longitudinal direction of the loaf.

The hold-down 150 holds the loaf against the infeed table 53 during movement through the slicer mechanism 18. When the pusher 54 is retracted, the linear thruster 154 is actuated to elevate the pressure plate 152 to its fully raised position as illustrated in FIGS. 6 and 7. The pressure plate remains raised until a loaf of bread has been diverted into position between the pusher 54 and the slicing mechanism 18 as detected by the proximity switch in the stop plate 70. The pressure in the thruster cylinder 176 is then released and the pressure plate 152 drops (as the pusher 54 begins its movement) until it rests on top of the loaf to be sliced. The weight of the pressure plate 152 is sufficient to hold the loaf against the infeed table 53 during slicing to prevent oscillation of the bread with the blades 84. The hold-down also improves the effect of the ridge 80 to orient the loaf for proper presentation to the slicer 18. In the most preferred embodiment, wherein the pressure plate 152 is inclined slightly to be lower at its trailing portion 158, the loaf encounters slightly increasing resistance and pressure as it moves along the infeed table 53. This improved pressure has been found desirable to further reduce loaf movement during slicing.

When the pusher 54 has been extended fully through the slicer blades, the proximity switch (not shown) on the thruster is actuated; and the control 120 actuates the diverter 20 (FIG. 3) to move the loaf through the bagging mechanism 22. Specifically, the finger or lug 116 engages the lower end or heel of the loaf and propels the loaf upwardly along the outfeed table 82 through the bagging mechanism 22 and onto the catch tray 24. The loaf passes through and is guided by the funnels 102 of the bagging mechanism 20. The loaf slides into the expanded bag or wrapper as the loaf passes through the bagging mechanism 20. The momentum of the loaf tears the expanded bag from the bagger, which also draws a new bag into position for the next loaf. When the bagged loaves reach the catch tray 24, they slide down to the bottom of the catch tray until removed by the operator. When the diverter 20 is actuated, the pusher 54 is retracted to and the pressure plate 152 is raised to receive the next loaf of bread from the diverter 14. The full raising of the hold-down 152 for each loaf of bread enables the slicer to process a continuous stream of loaves having markedly different heights.

Not unexpectedly, the movement and slicing of loaves within the device 10 produces a large number of crumbs. Typically, these crumbs travel because of gravity to a position against the stop plate 70 and the lower guide 72. Through the action of the pusher 54, the loaves tend to push the crumbs onto the outfeed table 82. After each loaf is sliced and as the pusher 54 is returning to its retracted position, the control 120 actuates the cylinder 132 to open the trap door 130 and release the crumbs from the outfeed table. This insures that the infeed and outfeed tables remain relatively crumb free to reduce impediments to movement of the loaves through the system.

The present slicer/bagger, through its layout and configuration, provides a compact unit capable of both slicing and bagging individual loaves. The unit is operable by a single worker primarily because the infeed conveyor and the catch tray are proximate one another. The ridge in the infeed table just prior to the slicing mechanism insures that all loaves are properly oriented for presentation to the slicer in a fashion producing perpendicular slices. The crumb dispensing trap door insures that crumbs will not accumulate on the slicing table and thereby impede movement of the loaves through the device. The hold-down mechanism insures that loaves are properly supported and/or held in position during slicing.

The above description is that of a preferred embodiment of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A continuous feed bread slicer and bagger assembly comprising:
   an infeed conveyor means for conveying unsliced loaves in an infeed direction, said infeed conveyor means including stop means against which the unsliced loaves accumulate;

slicer means for slicing loaves, said slicer means including an oscillating knife slicer, an infeed table leading to said slicer, and an outfeed table leading from said slicer, said infeed and outfeed tables being substantially coplanar, said infeed table being inclined from horizontal downwardly away from said infeed conveyor means;

first diverter means for diverting an accumulated loaf transversely from said conveyor means onto said infeed table;

reciprocable pusher means for pushing a loaf on said infeed table through said slicer and onto said outfeed table in a slicing direction generally parallel to the infeed direction, said pusher means being reciprocable between a retracted position remote from said slicer means wherein a loaf can be received between said pusher means and said slicer means and an extended position proximate said slicer means;

bagger means for bagging a loaf of bread; and second diverter means for diverting a sliced loaf transversely from said outfeed table, upwardly along said outfeed table, and through said bagger means.

2. An assembly as defined in claim 1 wherein said outfeed table is coplanar with said infeed table; at least one of said infeed table and said outfeed table defines a crumb aperture in its lower portion; and further comprising a trap door movably mounted within said aperture and movable between a closed position coplanar with said one table and an open position.

3. An assembly as defined in claim 1 further comprising control means for coordinating actuation of said diverter means and said pusher means so that loaves are diverted only when said pusher means is in the retracted position.

4. An assembly as defined in claim 1 further comprising catch tray means for receiving bagged loaves of bread from said bagger means, said second diverter means diverting the sliced loaves through said bagger means and onto said catch tray means.

5. a bread slicer comprising:
knife means for slicing bread;
generally planar table means for supporting a loaf for sliding movement;
pusher means for pushing a loaf across said table means and through said knife means; and
hold-down means for holding a loaf against said table means during movement through said knife means, said hold-down means including a generally planar pressure plate substantially parallel to said table means, said hold-down means further including reciprocating means for reciprocating said pressure plate between a raised position and a plurality of lower positions, whereby said pressure plate can be moved to its raised position so that a loaf can be positioned on said table means between said knife means and said pusher means and said pressure plate can be moved from its raised position to a lower position engaging the loaf to secure the loaf between said pressure plate and said table means during slicing.

6. A bread slicer as defined in claim 5 wherein said hold-down means further includes control means for actuating said reciprocating means to lift said pressure plate to its raised position prior to each loaf being positioned thereunder and to lower said pressure plate to a lower position engaging each loaf positioned thereunder.

7. A bread slicer as defined in claim 5 wherein said pressure plate is slightly inclined from being parallel to said table means, said pressure plate including a trailing portion adjacent said knife means and closer to said table means than the remainder of said plate.

8. A bread slicer as defined in claim 5 wherein said hold-down means further comprises stop means for keeping said pressure plate above said pusher means.

9. A bread slicer as defined in claim 5 wherein said reciprocating means includes a pneumatic cylinder.

10. An improved bread slicer including table means for supporting a loaf of bread, motive means for moving the loaf on said table means in a first direction, slicer means operatively aligned with said table means for slicing the loaf as it moves in the first direction, and hold-down means for holding the loaf against said table means as the loaf moves in the first direction, wherein the improvement comprises said hold-down means comprising:
pressure plate means for forming a continuous surface generally parallel to said table means; and
motive means for lifting said pressure plate means away from said table means a sufficient distance so that a loaf can be moved under said pressure plate means without engaging said pressure plate means and for lowering said pressure plate means to engage the loaf positioned thereunder and thereby secure the loaf during slicing.

11. An improved bread slicer as defined in claim 10 wherein said hold-down means further comprises control means for controlling actuation of said motive means to cause said pressure plate to be lifted prior to each loaf being moved thereunder and to cause said pressure plate to be thereafter lowered to engage each loaf positioned thereunder.

12. An improved bread slicer as defined in claim 10 wherein said pressure plate means is inclined at a slight angle to said table means to form a slightly tapered opening between said pressure plate means and said table means.

13. An improved bread slicer as defined in claim 10 wherein:
said motive means includes pusher means for pushing the loaf; and
said hold-down means further comprises stop means for preventing said pressure plate means from moving into the path of said pusher means.

14. A bread slicer and bagger system comprising:
conveyor means for conveying unsliced loaves;
first diverter means for diverting loaves transversely from said conveyor means;
slicer means for slicing loaves;
mover means for moving loaves diverted by said first diverter means through said slicer means;
table means for supporting the loaves as they move through said slicer means, said table means being inclined from the horizontal, sloping downwardly from said conveyor means;
a loaf-orientation means extending upwardly from the plane of said table means, said loaf-orientation means being elongated and oriented perpendicularly to the direction of movement of said mover means, whereby an elongated loaf moving over said table means will engage said loaf-orientation means and become oriented perpendicularly to the direction of movement;

bagger means for holding a bread bag in a fashion permitting a loaf to be inserted thereinto; and second diverter means for diverting sliced loaves transversely from the slicer path through said bagger means.

15. A continuous feed bread slicing machine comprising:
knife means for slicing a loaf;
a slicing table for supporting loaves as they move through said knife means, said table having an infeed table portion and an outfeed table portion on opposite sides of said knife means;
conveyor means for conveying unsliced loaves;
first transfer means for diverting loaves individually from said conveyor means in an infeed direction onto said infeed table;
pusher means for pushing a loaf in a slicing direction from said infeed table portion, through said knife means, and onto said outfeed table portion;
second transfer means for diverting loaves individually from said outfeed table portion in an outfeed direction generally opposite to said infeed direction; and
receiving means for receiving loaves diverted by said second transfer means.

16. A machine as defined in claim 15 wherein said receiving means includes bagger means for holding a bread bag in a fashion permitting a loaf to be inserted thereinto.

17. A machine as defined in claim 16 wherein said receiving means further includes a catch tray means for receiving sliced bagged loaves from said bagger means.

18. A machine as defined in claim 15 further comprising control means for actuating said first transfer means only when said reciprocable pusher means is positioned to receive a loaf between said pusher means and said knife means.

19. A machine as defined in claim 15 wherein said slicing table is inclined from the horizontal having a high portion proximate said conveyor means and a low portion, whereby loaves transferred onto said slicing table from said conveyor means tend to gravity-slide downwardly along said slicing table.

20. A machine as defined in claim 19 further comprising a trap door movably mounted in said lower portion of said slicing table, whereby crumbs accumulating on said lower portion of said slicing table can be discharged by opening said trap door.

21. A machine as defined in claim 15 further comprising control means for stopping said conveyor means when a loaf thereon is in position for said first transfer means.

22. A machine as defined in claim 15 wherein said infeed table includes a ridge extending upwardly therefrom, said ridge being substantially perpendicular to said first direction.

23. A machine as defined in claim 16 wherein said pusher means is a reciprocable between retracted position wherein a loaf can be received between said pusher means and said knife means and an extended position proximate said knife means.

24. A bread slicer comprising:
a knife assembly for slicing bread moving therethrough in a first direction;
a planar table perpendicular to said blades and having infeed and outfeed portions on opposite sides of said knife assembly, said table being inclined from horizontal in a second direction perpendicular to said first direction so that said table has a lower end and higher end, said table including a generally continuous guide surface along said lower end of said table, said guide surface being parallel to the first direction; and
pusher means for pushing a loaf of bread resting on said infeed table portion in the first direction through said knife assembly and onto said outfeed table portion,
whereby a loaf will rest against said slide along said guide surface as the loaf is pushed along said table by said pusher means.

25. A bread slicer as defined in claim 24 wherein said infeed table portion includes an elongated loaf-orientation means extending upwardly from said table and oriented substantially perpendicularly to the first direction, whereby an elongated loaf sliding over said loaf-orientation means will catch thereon and become oriented substantially perpendicularly to the first direction.

26. A bread slicer as defined in claim 24 wherein said outfeed table portion defines a crumb aperture in its lower end, and further comprising a trap door movably mounted within said aperture and movable between a closed position coplanar with said outfeed table portion and an open position.

27. A bread slicer as defined in claim 24 wherein said pusher means is reciprocable between a retracted position remote from said knife assembly whereupon a loaf can be positioned between said pusher means and said knife assembly and an extended position proximate said knife assembly.

28. A bread slicer as defined in claim 24 further comprising outfeed diverter means for diverting a loaf on said outfeed table portion upwardly therealong in an outfeed direction perpendicularly to the first direction to remove the loaf from said table.

29. A bread slicer as defined in claim 28 further comprising infeed diverter means for diverting a loaf onto said infeed table portion in an outfeed direction perpendicular to the first direction, whereupon the loaf will slide downwardly along said table until it abuts said fence.

30. A bread slicing apparatus comprising:
slicing means for slicing a loaf of bread moving therethrough in a first direction;
an infeed table means adjacent said slicing means for supporting a loaf of bread as it moves into said slicing means;
motive means for urging a loaf along said infeed table means and through said slicing means;
said infeed table means including orientation means for orienting an elongated loaf moving thereon in an orientation substantially perpendicular to said first direction to improve the perpendicular slicing of the loaf, said orientation means extending upwardly from said infeed table means and being elongated and oriented generally perpendicularly to the first direction, whereby an elongated loaf moving along said infeed table means will enage said orientation means and become oriented substantially perpendicularly to said first direction as the loaf slides over said orientation means.

31. A bread slicing apparatus as defined in claim 30 wherein said orientation means is stationary.

32. An apparatus as defined in claim 30 wherein said orientation means comprises an elongated ridge extending upwardly from said infeed table means.

33. An apparatus as defined in claim 32 wherein said orientation means is integral with said infeed table means.

34. An apparatus as defined in claim 30 wherein said orientation means is elongated and oriented substantially perpendicularly to the first direction.

35. An apparatus as defined in claim 30 wherein said orientation means extends substantially the entire length of said slicing means.

36. A bread slicer comprising:
an infeed table for receiving loaves to be sliced and for supporting the loaves during slicing as the loaves move in a first direction, said table tilted from the horizontal in a second direction generally perpendicular to the first direction, whereby loaves can gravity-slide onto said table from a delivery mechanism;
a knife assembly at one tilted end of said infeed table for slicing a loaf moving therethrough, said knife assembly including a plurality of knives arranged in a linear configuration perpendicular to the first direction; and
an elongated ridge extending upwardly from said infeed table proximate said knife assembly, said ridge being perpendicular to said first direction, whereby an elongated loaf oriented generally in the second direction and moving across said infeed table in the first direction will engage said ridge and drag over said ridge so as to be oriented perpendicularly to said knife assembly for improved slicing.

37. A bread slicer as defined in claim 36 wherein said ridge extends substantially the full length of said knife assembly.

38. A bread slicer as defined in claim 36 wherein said ridge is integral with said infeed table.

39. A bread slicer comprising:
a knife assembly;
infeed and outfeed tables leading to and from said knife assembly, respectively, said infeed and outfeed tables being stationary, coplanar, and inclined from the horizontal so that each table has a lower portion, at least one of said infeed and outfeed tables defining a crumb aperture in its lower portion;
a trap door mounted within said aperture and having a closed position substantially coplanar with said one table and an open position out of said aperture permitting crumbs to fall through said aperture; and
actuator means for opening and closing said trap door.

40. A bread slicer as defined in claim 39 further comprising control means for periodically actuating said actuator means to periodically discharge said crumbs.

41. A bread slicer as defined in claim 40 further comprising motive means for moving a loaf over said infeed and outfeed tables and through said knife assembly, said control means being responsive to said motive means so that said actuator means is actuated only when a loaf is not above said trap door.

42. A bakery product processing machine comprising:
a substantially planar table for supporting a bakery product for sliding movement thereon, said table being stationary and inclined from the horizontal to include a lower end, whereby crumbs on said table will tend to gravitate toward said lower end;
an aperture within said lower end of said table through which crumbs can fall; and
a trap door movably mounted within said aperture, said door being movable between a closed position wherein said door is substantially coplanar with said table so that said table and said door form a substantially continuous surface and an open position permitting crumbs to fall through said aperture.

43. A machine as defined in claim 42 further comprising actuator means for moving said door between the closed and opened positions.

44. A machine as defined in claim 43 further comprising mover means for moving a bakery product across said table and said door, said actuator means being responsive to said mover so that said door remains closed when a loaf is moving thereover.

45. A machine as defined in claim 44 wherein said actuator means opens said door after each passage of a loaf thereover.

46. A continuous feed bread slicer and bagger assembly comprising:
an infeed conveyor means for conveying unsliced loaves in a first direction;
slicer means for slicing loaves, said slicer means including an oscillating knife slicer, an infeed table leading to said slicer, and an outfeed table leading from said slicer;
pusher means for pushing a loaf on said infeed table through said slicer and onto said outfeed table in a second direction generally parallel to the first direction, said infeed table including an elongated loaf-orientation means extending upwardly from said table and oriented substantially perpendicularly to said second direction, whereby an elongated loaf sliding over said loaf-orientation means will catch thereon and become oriented substantially perpendicularly to said second direction;
first diverter means for diverting an accumulated loaf transversely from said conveyor means onto said infeed table;
bagger means for bagging a loaf of bread; and
second diverter means for diverting a sliced loaf from said outfeed table through said bagger means.

* * * * *

UNITED STATES PATENT AND TRADEMARK OFFICE
CERTIFICATE OF CORRECTION

PATENT NO. : 4,759,168

DATED : July 26, 1988

INVENTOR(S) : Bernard L. Petersen and Gary L. Kruse

It is certified that error appears in the above-identified patent and that said Letters Patent is hereby corrected as shown below:

Column 9, line 43:
 "a" should be --A--.
Column 11, line 58:
 "a" before "reciprocable" should be --a-- before "retracted position".
Column 12, line 2:
 should be --a-- after "and".
Column 12, line 10:
 "said" should be --and--.
Column 12, line 36:
 "perpendicularly" should be --perpendicular--.
Column 12, line 60:
 "enage" should be --engage--.

Signed and Sealed this

Fourteenth Day of February, 1989

*Attest:*

DONALD J. QUIGG

*Attesting Officer*          *Commissioner of Patents and Trademarks*